United States Patent
Kim

(10) Patent No.: US 8,542,734 B2
(45) Date of Patent: Sep. 24, 2013

(54) MULTI-VIEW VIDEO ENCODING APPARATUS AND METHOD

(75) Inventor: Tae-hee Kim, Paju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1730 days.

(21) Appl. No.: 11/653,903

(22) Filed: Jan. 17, 2007

(65) Prior Publication Data

US 2007/0183495 A1    Aug. 9, 2007

(30) Foreign Application Priority Data

Feb. 7, 2006  (KR) ........................ 10-2006-0011775

(51) Int. Cl.
*H04N 7/12* (2006.01)
*H04N 11/02* (2006.01)
*H04N 11/04* (2006.01)

(52) U.S. Cl.
USPC .................................................... 375/240.12

(58) Field of Classification Search
USPC .................................................... 375/240.12
See application file for complete search history.

(56) References Cited

U.S. PATENT DOCUMENTS

| | | | | | |
|---|---|---|---|---|---|
| 5,694,171 | A | * | 12/1997 | Katto ........................ | 375/240.03 |
| 7,672,378 | B2 | * | 3/2010 | Ng et al. .................... | 375/240.26 |
| 7,710,462 | B2 | * | 5/2010 | Xin et al. ................... | 348/218.1 |
| 2003/0202592 | A1 | * | 10/2003 | Sohn et al. ................. | 375/240.16 |
| 2006/0002612 | A1 | | 1/2006 | Vigouroux et al. | |
| 2006/0029134 | A1 | * | 2/2006 | Winder et al. ............ | 375/240.12 |

FOREIGN PATENT DOCUMENTS

| | | | |
|---|---|---|---|
| EP | 1494483 | A2 | 1/2005 |
| JP | 07-236163 | A | 9/1995 |
| JP | 7-327228 | A | 12/1995 |
| JP | 11-161800 | A | 6/1999 |
| JP | 2000-232659 | A | 8/2000 |
| JP | 200580179 | A | 3/2005 |
| JP | 200620330 | A | 1/2006 |
| KR | 10-2003-0083285 | A | 10/2003 |
| WO | 02/37859 | A3 | 5/2002 |
| WO | WO 02/37859 | * | 5/2002 |
| WO | 2006/001653 | A1 | 1/2006 |

OTHER PUBLICATIONS

Wiegand, T.; Sullivan, G.J.; Bjontegaard, G.; Luthra, A.; , "Overview of the H.264/AVC video coding standard," Circuits and Systems for Video Technology, IEEE Transactions on , vol. 13, No. 7, pp. 560-576, Jul. 2003 doi: 10.1109/TCSVT.2003.815165 URL: http://ieeexplore.ieee.org/stamp/stamp.jsp?tp=&arnumber=1218189&isnumber=27384.*

(Continued)

*Primary Examiner* — Saleh Najjar
*Assistant Examiner* — Michael Chao
(74) *Attorney, Agent, or Firm* — Sughrue Mion, PLLC

(57) ABSTRACT

A multi-view video encoding apparatus and a method thereof are provided. The apparatus includes: a multi-view video input unit which receives a multi-view video; an I frame location determination unit which determines a location of an I frame which is a basis for encoding the multi-view video according to characteristics of multi-view frames at a predetermined time; and an encoding unit which encodes the multi-view video based on the determined location of the I frame. When the apparatus and the method are used, the location of the I frame, which is a basis for compression-encoding a multi-view video, can be adaptively determined and not fixed, thereby enhancing prediction efficiency and compression rates.

25 Claims, 7 Drawing Sheets

(56) References Cited

OTHER PUBLICATIONS

Richardson, H.264/MPEG-4 Part 10, 2004, John Wiley & Sons, Ltd., Retrieved from the Internet <URL: guohanwei.51.net/motion/H.264.pdf>, pp. 1-65 as printed.*

Turaga, I/P Frame Selection Using Classification Based Mode Decision, 2001, Retrieved from the Internet <URL: ieeexplore.ieee.org/xpls/abs_all.jsp?arnumber=958173>, pp. 1-4 as printed.*

Sohn et al. (Lim et al.), Motion/Disparity-Compensated Multiview Sequence Coding, 2004, Retrieved from the Internet <URL: springerlink.com/content/wm4h3w1gdp8y4r1f/>, pp. 1-19 as printed.*

Lim J et al.: "A Multi-view sequence CODEC with view scalability", Signal Processing. Image Communication, Elsevier Science Publishers, Amsterdam, NL, vol. 19, No. 3, Mar. 2004, pp. 239-256.

Lee J et al.: "Adaptive Frame Type Selection for Low Bit-Rate Video Coding", SPIE Visual Communications and Image Processing, vol. 2308, No. Part 2. Sep. 25, 1994, pp. 1411-1422.

Communication issued on Dec. 13, 2011 by the Japanese Patent Office in the counterpart Japanese Patent Application No. 2007-023458.

Korean Office Action issued in corresponding Application No. 10-2006-0011775, issued Jul. 30, 2007.

Guoping Li, et al.; "A Novel Multi-view video coding Scheme Based on H.264"; IEEE; Dec. 2003; 5 pages total.

Phillip Merkle, et al.; Statistical Evaluation of Spatiotemporal Prediction for MVC; Jul. 2005; Fraunhofer HHI, 5 pages total.

* cited by examiner

MULTI-VIEW VIDEO ENCODING APPARATUS AND METHOD

CROSS-REFERENCE TO RELATED PATENT APPLICATIONS

This application claims priority from Korean Patent Application No. 10-2006-0011775, filed on Feb. 7, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to multi-view video encoding, and more particularly, to multi-view video encoding which adaptively determines a location of an I frame, which is a basis for compression-encoding a multi-view video, to enhance compression efficiency.

2. Description of the Related Art

FIG. 1 illustrates a related art multi-view video input system. Referring to FIG. 1, a multi-view video is a plurality of videos input from a plurality of cameras at a plurality of viewpoints. Therefore, a multi-view video encoding apparatus receives a plurality of videos at different viewpoints from the cameras. Since a multi-view video inherently requires a large amount of data, a compression-encoding process is a must to provide an effective three-dimensional (3D) service using a multi-view video. Motion Picture Experts Group (MPEG), an international motion picture standardization group, is discussing the use of H.264-based technology, which is known to be a superior video encoder, in encoding a multi-view video.

SUMMARY OF THE INVENTION

The present invention provides a multi-view video encoding apparatus and method which adaptively determines the location of an I frame, which is a basis for compression-encoding a multi-view video, to enhance prediction efficiency and compression rates.

According to an aspect of the present invention, there is provided a multi-view video encoding apparatus comprising: a multi-view video input unit which receives a multi-view video; an I frame location determination unit which determines a location of an I frame which is a basis for encoding the multi-view video according to characteristics of multi-view frames at a predetermined time; and an encoding unit which encodes the multi-view video based on the determined location of the I frame.

The multi-view video input unit may transmit the multi-view frames at the predetermined time to the I frame location determination unit and transmit a multi-view video for each viewpoint to the encoding unit.

The I frame location determination unit may determine the location of the I frame, which is most efficient for predicting P reference frames when one of the multi-view frames at the predetermined time is encoded as the I frame, and the remaining multi-view frames obtained at the same time as the I frame are prediction-encoded as the P reference frames with reference to the I frame.

The I frame location determination unit may select one of the multi-view frames at the predetermined time and encode the selected multi-view frame as the I frame, prediction-encode remaining multi-view frames obtained at the same time as the I frame as P reference frames with reference to the I frame, add numbers of bits used to encode the I frame and the P reference frames, store respectively the added numbers of bits generated at each viewpoint, and determine a location of a frame that, when encoded as the I frame, results in the smallest number of bits used as the location of the I frame.

When selecting one of the multi-view frames at the predetermined time and encoding the selected multi-view frame as the I frame, the I frame location determination unit may sequentially select each of the multi-view frames at the predetermined time as the I frame and encode the remaining multi-view frame based on the I frame.

The I frame location determination unit may prediction-encode multi-view frames located before the determined location of the I frame as the P reference frames in a reverse direction from the I frame and prediction-encode multi-view frames located after the determined location of the I frame as the P reference frames in a forward direction from the I frame.

The encoding unit may comprise a multi-view video arrangement unit which adds at least one multi-view frame to which another multi-view frame at a viewpoint before or after the determined location of the I frame and at the same time as the I frame refers for prediction encoding and arranges a bitstream required to encode a video of each viewpoint.

The encoding unit may further comprise an H. 264 encoding unit which performs an H. 264 encoding process using the arranged bitstream, wherein the H. 264 encoding unit sequentially encodes a bitstream of each viewpoint.

The encoding unit may further comprise a multi-view video bitstream output unit which removes the added at least one multi-view frame from the encoded bitstream of each viewpoint.

According to another aspect of the present invention, there is provided a multi-view video encoding method comprising: receiving a multi-view video; determining a location of an I frame which is a basis for encoding the multi-view video according to characteristics of multi-view frames at a predetermined time; and encoding the multi-view video based on the determined location of the I frame.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

The present invention will now be described more fully with reference to the accompanying drawings, in which exemplary embodiments of the invention are shown. The invention may, however, be embodied in many different forms and should not be construed as being limited to the exemplary embodiments set forth therein; rather, these exemplary embodiments are provided so that this disclosure will be thorough and complete, and will fully convey the concept of the invention to those skilled in the art.

Figure 2:
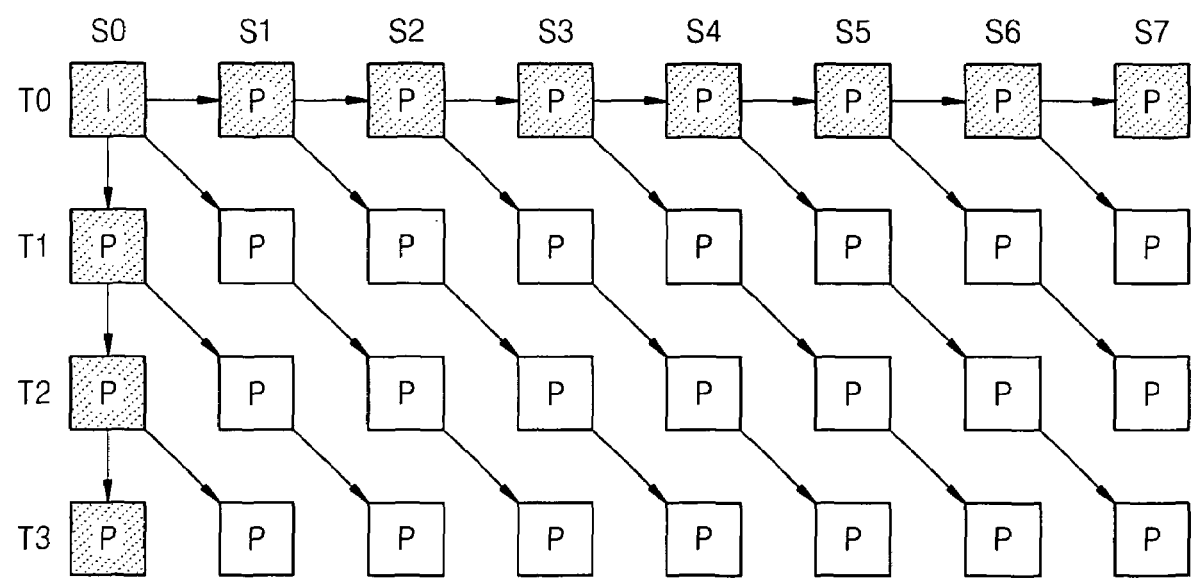
FIG. 2 illustrates multi-view video encoding in a (T-1, S-1) mode.

Three modes in which an H.264 encoder performs a multi-view video encoding method will now be described with reference to FIGS. 2 through 4. FIG. 2 illustrates multi-view video encoding in a (T-1, S-1) mode. In the (T-1, S-1) mode illustrated in FIG. 2, P reference frames are generated in a temporal direction and a spatial direction from an I frame (grey frames in the uppermost row and the leftmost column). Then, subsequent P frames are successively prediction-encoded as indicated by arrows. The (T-1, S-1) mode is a combination of a (T-1, S) mode and a (T, S-1) mode, which will be described below.

Figure 3:
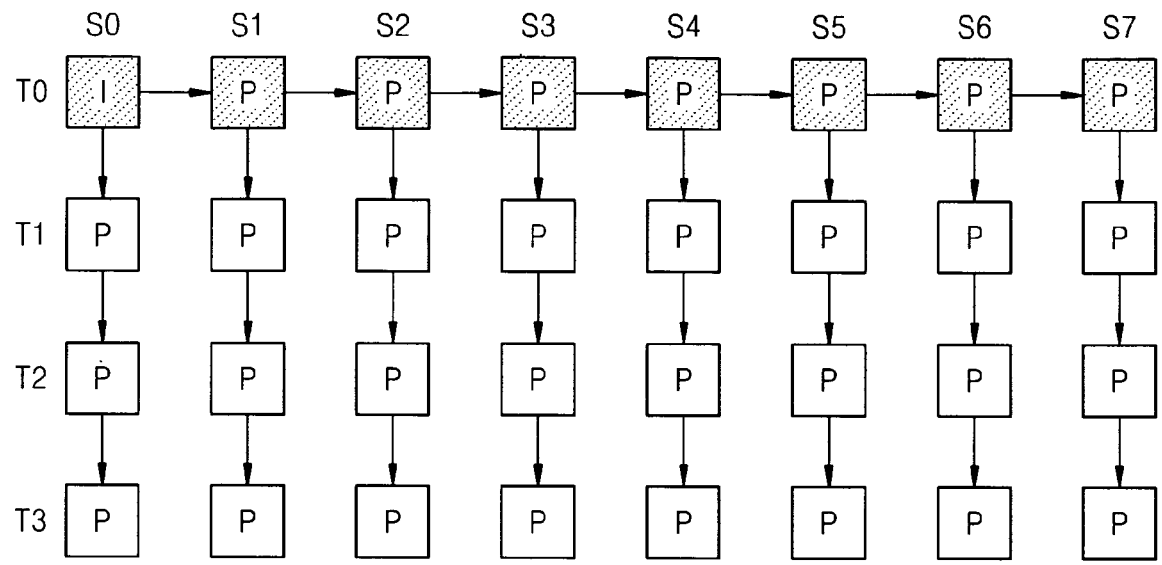
FIG. 3 illustrates multi-view video encoding in a (T-1, S) mode.

FIG. 3 illustrates multi-view video encoding in the (T-1, S) mode. In the (T-1, S) mode illustrated in FIG. 3, P reference frames are in a horizontal direction, that is, in a spatial direction, prediction-encoded and generated with reference to a first frame, that is, an I frame, among frames at an initial time. Then, the video frames at the initial time (grey frames in the uppermost row of FIG. 3) are designated as the P reference frames for prediction-encoding, and subsequent frames are in a vertical direction, that is, temporally, prediction-encoded. An encoding process after the P reference frames are generated is identical to a related art H.264 encoding process.

Figure 4:
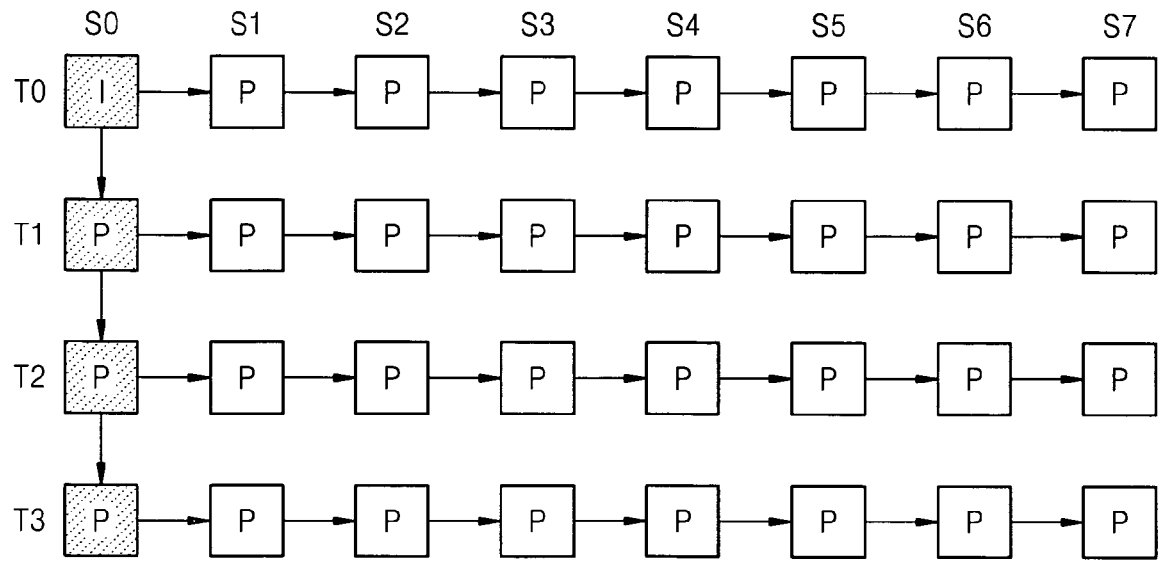
FIG. 4 illustrates multi-view video encoding in a (T, S-1) mode.

FIG. 4 illustrates multi-view video encoding in the (T, S-1) mode. In the (T, S-1) mode illustrated in FIG. 4, P reference frames are in a vertical direction, that is, temporally, prediction-encoded and generated with reference to a first frame, that is, an I frame, among frames at a first viewpoint. Then, the video frames at the first viewpoint (grey frames in the leftmost column of FIG. 4) are designated as the P reference frames for prediction-encoding, and subsequent frames are prediction-encoded in a horizontal direction, that is, spatially. The encoding process after the P reference frames are generated is identical to the related art H.264 encoding process.

In the same way that a temporal correlation between frames increases as a sampling frequency increases, the spatial correlation between the frames increases as the distance between cameras for acquiring a multi-view video decreases. Since a change in the direction of time is less than a change in the viewpoints, the (T-1, S) mode has the best compression efficiency among the three modes described above. According to the related art encoding method described with reference to FIGS. 2 through 4, the encoding process is performed based on an I frame disposed at a predetermined location. Then, P reference frames for each mode are prediction-encoded based on the I frame, and an independent encoding process is performed at each viewpoint. Subsequent P frames which refer to the P reference frames are compression-encoded by the H.264 encoder from the P reference frames in a direction depending on the mode in which the H.264 encoder operates.

In the encoding method described with reference to FIGS. 2 through 4, a frame at the first viewpoint at the initial time is always designated as an I frame, and an encoding process is performed accordingly. In this case, however, optimal compression efficiency may not be obtained that will be described now with reference to FIGS. 5 and 6. In other words, compression efficiency may not be high.

Figure 5:
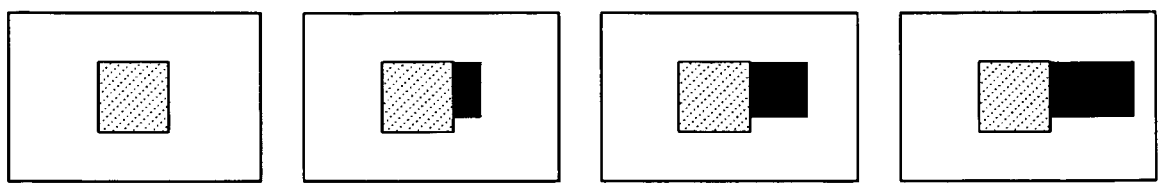
FIG. 5 illustrates an image in which a new region appears according to a shift in viewpoint.

FIG. 5 illustrates an image in which a new region appears according to a shift in viewpoint. Referring to FIG. 5, as a viewpoint shifts, a region which was previously hidden gradually appears in a frame. In this case, the probability of failure in block prediction for the newly appeared region is high, thereby deteriorating compression efficiency. In the image of FIG. 5, when the encoding process is performed when the rightmost frame of the first viewpoint is designated as an I reference frame, higher prediction efficiency and compression rates can be obtained over the related art encoding method.

Figure 6:
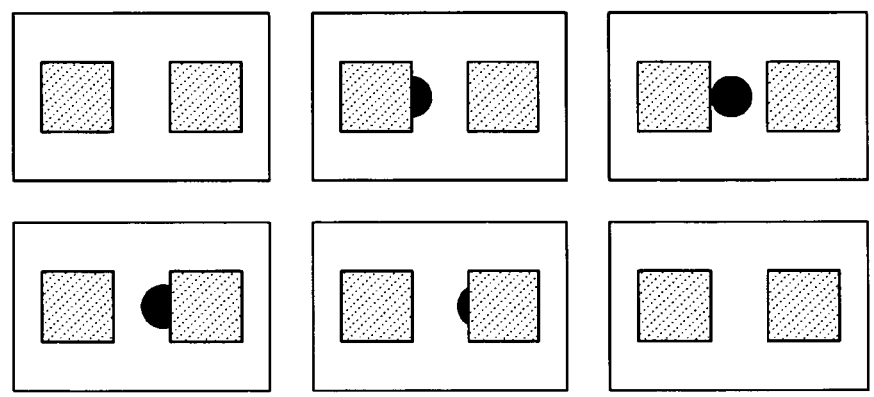
FIG. 6 illustrates an image in which a new region appears and then disappears according to a shift in viewpoint.

FIG. 6 illustrates an image in which a new region appears and then disappears according to a shift in viewpoint. Referring to FIG. 6, as a viewpoint shifts, a region which was previously hidden gradually appears in a frame and then disappears. In this case, since a block which fails to be predicted with a high probability exists even when the encoding process is performed when the rightmost frame of the first viewpoint is designated as an I reference frame as in FIG. 5, compression efficiency deteriorates. Therefore, in a frame of a video having a region which was previously hidden but appears after a shift in viewpoint, a frame at a new location must be determined as the I frame according to characteristics of the image. In other words, instead of fixing the location of an I frame, which is a basis for video encoding, as in the related art encoding method, the location of the I frame is adaptively determined to be a location showing the best compression efficiency according to the characteristics of an image, and the encoding process is performed accordingly.

Figure 7:
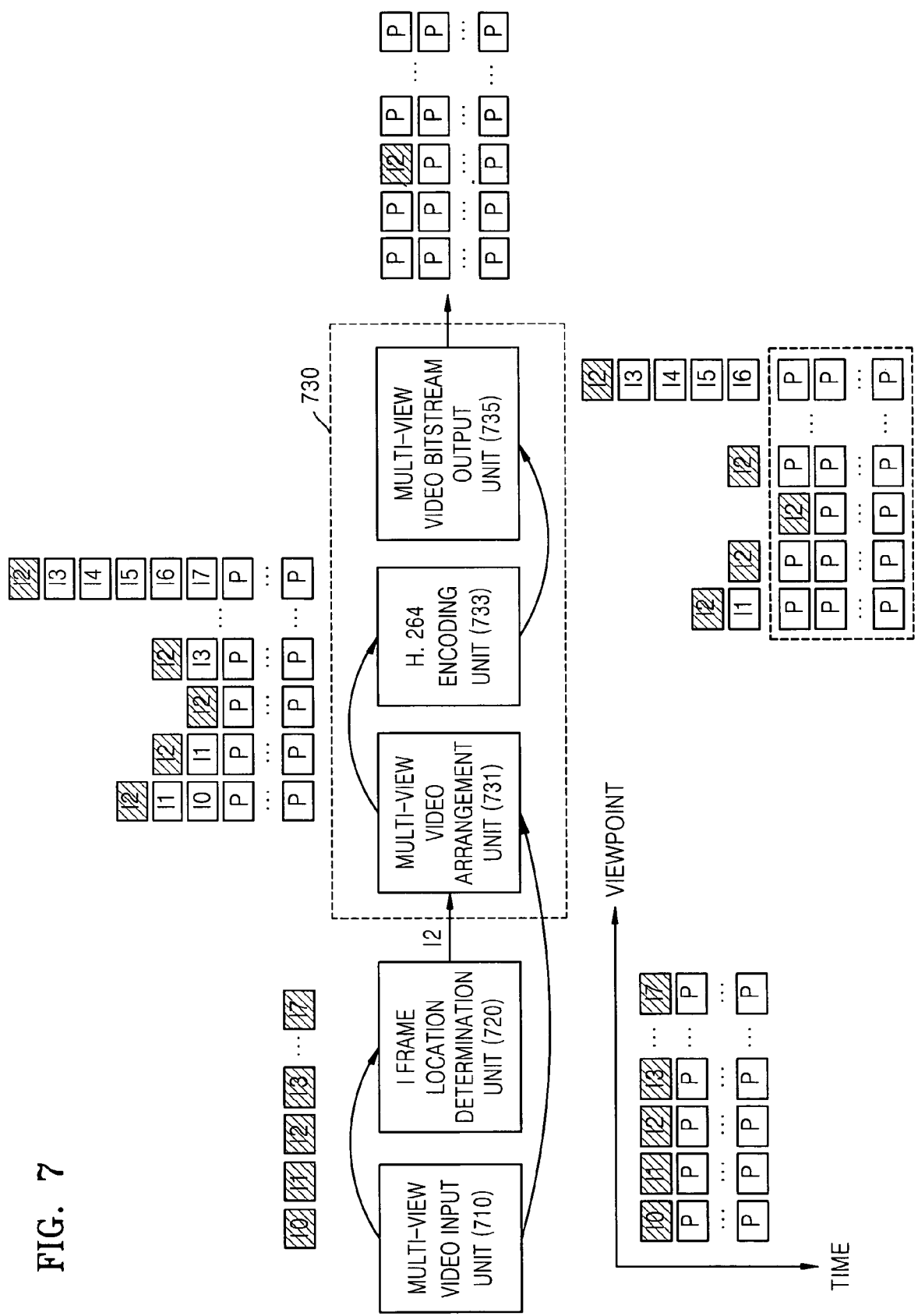
FIG. 7 illustrates a multi-view video encoding apparatus according to an exemplary embodiment of the present invention.

FIG. 7 illustrates a multi-view video encoding apparatus according to an exemplary embodiment of the present invention. Referring to FIG. 7, the multi-view video encoding apparatus includes a multi-view video input unit 710, an I frame location determination unit 720, and an encoding unit 730.

Figure 1:
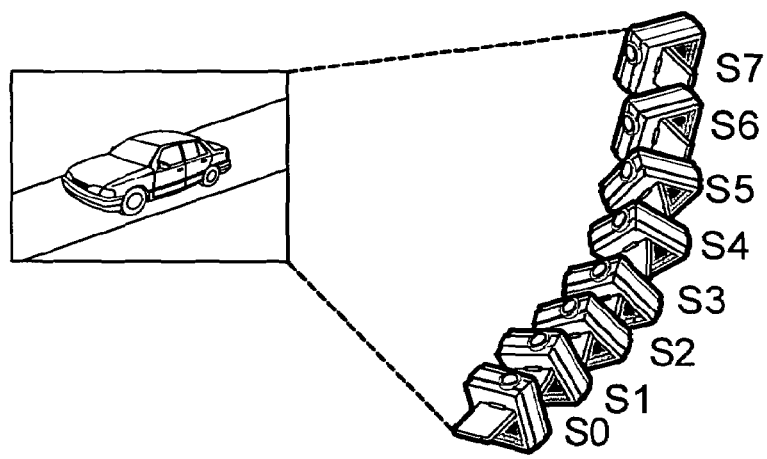
FIG. 1 illustrates a related art multi-view video input system.

The multi-view video input unit 710 receives videos respectively from a plurality of cameras equal in number to the viewpoints. The cameras are regularly distanced in an arc as illustrated in FIG. 1, and frames taken by the cameras are input to the multi-view video input unit 710. The multi-view video input unit 710 transmits multi-view frames at a predetermined time, for example, multi-view frames I0 through I7 at an initial time, to the I frame location determination unit 720 and transmits a multi-view video (multi-view frames I1 through I7 and P frames predicted at each viewpoint based on multi-view frames I1 through I7) input for each viewpoint of a multi-view image to a multi-view video arrangement unit 731 included in the multi-view encoding unit 730.

The I frame location determination unit 720 determines the location of the I frame, which is a basis for multi-view video encoding, according to the characteristics of multi-view frames at a predetermined time. In other words, one of the multi-view frames at the predetermined time is adaptively determined as the I frame and encoded, and the remaining multi-view frames obtained at the same time as the I frame are prediction-encoded with reference to the I frame as the P reference frames. In this case, a location most efficient for the prediction of the P reference frames is determined as the location of the I frame.

To this end, the I frame location determination unit 720 selects one of the multi-view frames at the predetermined time as the I frame and encodes the I frame. The I frame location determination unit 720 also prediction-encodes the remaining multi-view frames which are obtained at the same time as the I frame as the P reference frames with reference to the I frame. Then, the I frame location determination unit 720 adds the numbers of bits used for the encoded I frame and P reference frames, stores the respective number of bits used when each of the viewpoints is selected as an I frame, and determines a location for which the smallest number of bits are used as the location of the I frame.

More specifically, multi-view frames of each viewpoint at a predetermined time, for example, multi-view frames at the initial time, are input to the I frame location determination unit 710. The I frame location determination unit 720 selects one of the multi-view frames at the initial time as the I frame and encodes the I frame. At this time, the I frame location determination unit 720 sequentially selects each of the multi-view frames obtained at the initial time as an I frame and encodes the I frames. This process is performed as follows.

A frame at a first viewpoint at the initial time is selected as an I frame and encoded, and frames at the remaining viewpoints are prediction-encoded as P reference frames with reference to the I frame. The numbers of bits used for the encoded I frame and P reference frames are added, and the total number of bits is stored. Then, a frame at a second viewpoint at the initial time is selected as an I frame and encoded, and frames at the remaining viewpoints are prediction-encoded as P reference frames. The numbers of bits for the encoded I frame and P reference frames are added, and the total number of bits is stored. In this case, a P reference frame at the first viewpoint is prediction-encoded in a reverse direction from the I frame of the second viewpoint relative to the other P reference frames.

In other words, when an M-view video is encoded, if a frame at an $N^{th}$ ($\leq M$) viewpoint is determined as the I frame, (M–N) frames at viewpoints after the I frame at the $N^{th}$ viewpoint are prediction-encoded as P reference frames in a forward direction from the determined I frame and (N–1) frames at viewpoints before the I frame at the $N^{th}$ viewpoint are prediction-encoded as P reference frames in the reverse direction from the determined I frame. Then, the total number of bits generated for encoding frame by the each viewpoint is stored respectively. This process is performed until M=N, and the numbers of bits generated for each viewpoint being designated as the I frame is stored.

The I frame location determination unit 720 determines the location of the I frame based on Equation 1 below. In other words, M generated numbers of bits are compared, and the I frame is placed at a viewpoint using the smallest number of bits. Then, P frames prediction-encoded based on the I frame are determined as the P reference frames of each viewpoint.

Location of I=arg min bit_amount (N)

$N \in \{0, \ldots, M-1\}$ (1), where bit_amount (N) denotes the number of bits generated when an $N^{th}$ viewpoint is set as the location of the I frame.

In a multi-view video illustrated in FIG. 7, the determined location of the I frame is the second viewpoint. The encoding unit 730 encodes the multi-view video with reference to the I frame thus determined. The encoding unit 730 generates P reference frames based on the determined location of the I frame. The encoding unit 730 includes the multi-view video arrangement unit 731, an H.264 encoding unit 733, and a multi-view video bitstream output unit 735.

The multi-view video arrangement unit 731 adds frames required to encode a video at each viewpoint. In other words, the multi-view video arrangement unit 731 adds frames to which frames at viewpoints before or after the determined location of the I frame and at the same time as the I frame refer for prediction-encoding. Referring to FIG. 7, a video at the first viewpoint can be encoded by the H.264 encoding unit 733 only after I2 and I1 frames are added before an I0 frame. A video at the second viewpoint can be encoded by the H.264 encoding unit 733 only after the I2 frame is added before the I1 frame. The multi-view video arrangement unit 731 arranges a bitstream for each viewpoint which is required to encode a video of each viewpoint. In other words, the multi-view video arrangement unit 731 arranges the I2 and I1 frames added to encode the video of the first viewpoint and a video bitstream of the first viewpoint input from the multi-view video input unit 710 before transmitting the same to the H. 264 encoding unit 733.

The H. 264 encoding unit 733 performs H.264 encoding using the arranged bitstream. The H.264 encoding is performed on sequentially input bitstreams for the respective viewpoints. A method of generating P frames with reference P reference frames is identical to the related art H. 264 encoding method. In the disclosure, encoding a multi-view video using the H.264 encoding method is described. However, the multi-view video can be encoded using encoding methods other than the H.264 encoding method.

The multi-view video bitstream output unit 735 removes the frames added by the multi-view video arrangement unit 731 such that only the bitstreams for frames required to decode a video of each viewpoint are used. In other words, the multi-view video bitstream output unit 735 takes only the bitstreams included in a block indicated by dotted lines, which is illustrated below the multi-view video bitstream output unit 735 in FIG. 7. For example, in FIG. 7, the multi-view video bitstream output unit 735 removes the I2 and I1 frames in a video bitstream of the first viewpoint, and removes I2 through I6 frames in a video bitstream of a last viewpoint.

Figure 8:
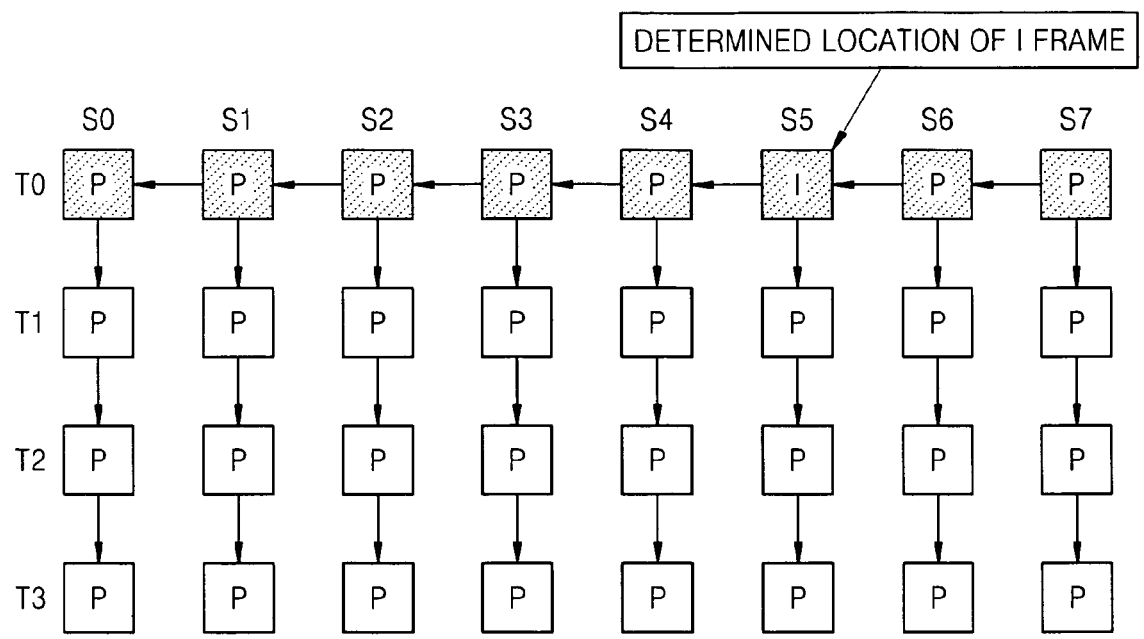
FIG. 8 is a view for illustrating a multi-view video encoding method according to an exemplary embodiment of the present invention.

FIG. 8 is a view for illustrating a multi-view video encoding method according to an exemplary embodiment of the present invention. Referring to FIG. 8, according to the multi-view video encoding method, the location of the I frame is adaptively determined to enhance prediction efficiency and a compression rate. In FIG. 8, the determined location of the I frame is a viewpoint S5. Frames at viewpoints S0 through S4 at a first time T0 are horizontally prediction-encoded in a reverse direction with reference to the I frame, and frames at viewpoints S6 and S7 at the first time T0 are horizontally prediction-encoded in a forward direction with reference to the I frame. Frames obtained after the first time T0 are sequentially encoded for each viewpoint using the H.264 encoding method.

Figure 9:
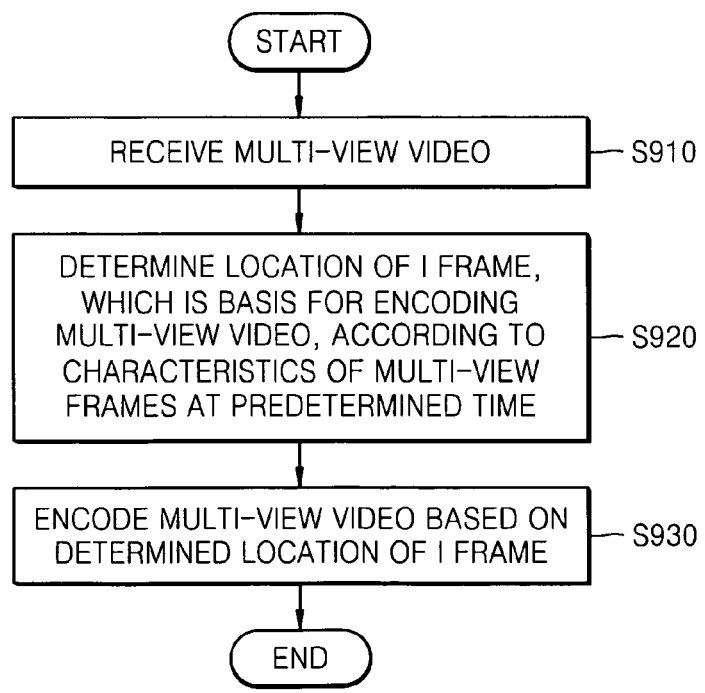
FIG. 9 is a flowchart illustrating the multi-view video encoding method according to an exemplary embodiment of the present invention.

FIG. 9 is a flowchart illustrating the multi-view video encoding method according to an exemplary embodiment of the present invention. Referring to FIG. 9, a multi-view video is input to the multi-view video input unit 710 (operation S910). The I frame location determination unit 720 determines the location of the I frame, which is a basis for encoding a multi-view video, according to the characteristics of multi-view frames at a predetermined time (operation S920). More specifically, of the multi-view frames at the predetermined time, a location most efficient for predicting P reference frames is determined as the location of the I frame. The multi-view frames at the predetermined time may be multi-view frames at an initial time. The multi-view video is encoded based on the determined location of the I frame (operation S930).

Figure 10:
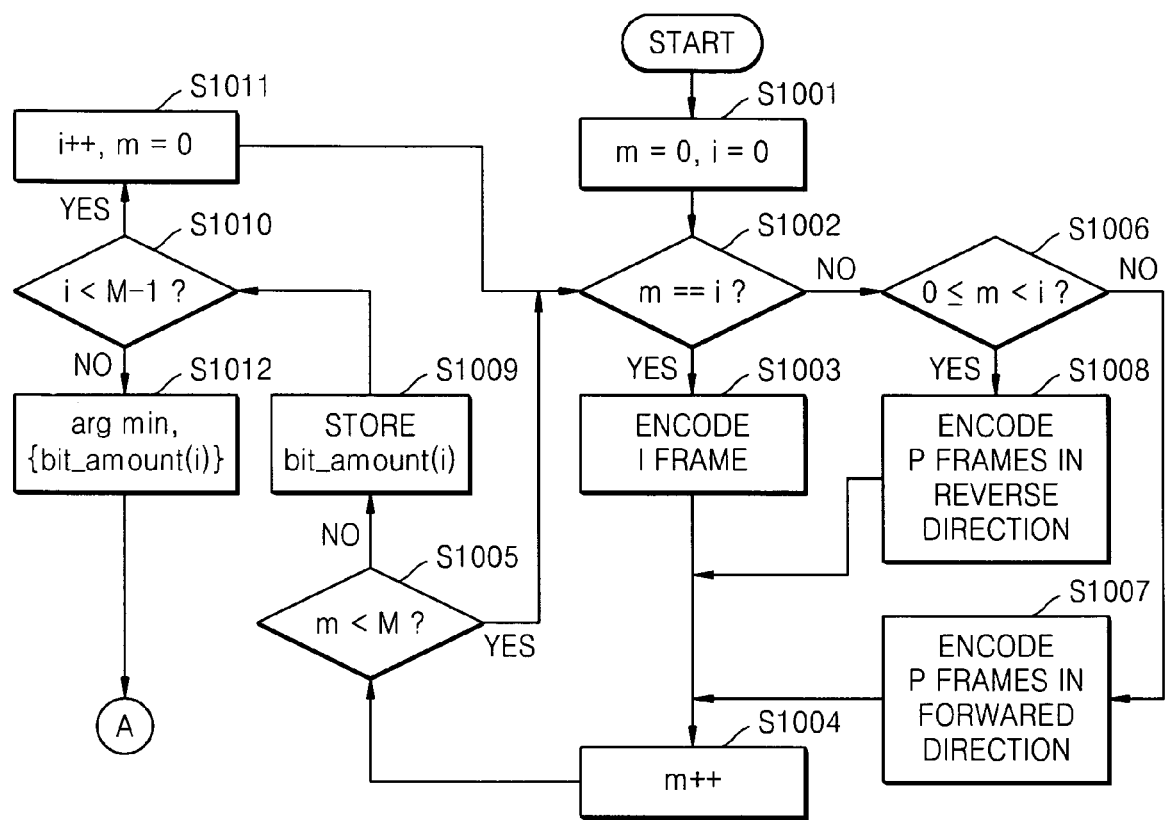
FIG. 10 is a detailed flowchart illustrating an operation of determining a location of an I frame in the multi-view video encoding method of FIG. 9, according to an exemplary embodiment of the present invention.

The multi-vide video encoding method will now be described in more detail with reference to FIGS. 10 and 11. FIG. 10 is a detailed flowchart illustrating the operation of determining the location of the I frame in the multi-view video encoding method of FIG. 9, according to an exemplary embodiment of the present invention. Referring to FIG. 10, M denotes the number of total viewpoints (or cameras), m is an index of a viewpoint of a frame being processed and is between 0 and M−1, i denotes the index of the I frame, and LoI (location of I frame) denotes an index of the determined location of the I frame.

A frame at a first viewpoint is determined as the I frame and frames at the initial time are encoded. In other words, m and i are set to zero (operation S1001). Then, it is determined whether m and i are equal (operation S1002). Since m and i are equal, the frame at the first viewpoint is encoded as the I frame (operation S1003), and m is increased by 1 (operation S1004). M and m are compared (operation S1005), and since m is less than M, operation S1002 is performed again. Since m is 1 and i is 0, m and i are not equal (operation S1002) and m is determined not to be less than i (operation S1006). Therefore, P frames are prediction-encoded in the forward direction with reference to the I frame at a first viewpoint, i.e., viewpoint 0 (operation S1007). m is increased by 1 (operation S1004). Since m is less than M, operation S1002 is performed again. The above operations are repeated until a frame at a last viewpoint is prediction encoded.

When the frame at the last viewpoint is encoded and m is increased by 1 (operation S1004), operation S1005 is performed, and it is determined that m is not less than M. Then, the number of bits generated by encoding the frames at the initial time when the frame at the first viewpoint is determined as the I frame is stored (operation S1009). Then, i and (M−1) are compared (operation S1010). Since i is less than (M−1), i is increased by 1 to 1 and m is set to 0 (operation S1011). In this way, the frame at the first viewpoint is encoded as the I frame and the remaining frames obtained at the same time as the I frame are prediction-encoded as the P reference frames, and the number of bits used for the encoding is stored.

Next, a frame at a second viewpoint is encoded as the I frame, and the remaining frames obtained at the same time as the I frame are prediction-encoded as the P reference frames with reference to the I frame. Since i=1 and m=0, m and i are not equal (operation S1002). That is, m is less than i. Therefore, a frame at a first viewpoint is prediction-encoded as a P reference frame in the reverse direction from the I frame. m is then increased by 1 (operation S1004) and operations S1005 and S1002 are sequentially performed. Since m and i are equal, the frame at the second viewpoint, i.e., viewpoint 1 is encoded as the I frame (operation S1003). Then, operations S1004, S1005, S1002, and S1006 are sequentially performed. A frame at a third viewpoint i.e., viewpoint 2 is prediction-encoded as a P reference frame in the forward direction from the I frame (operation S1007). The above operations are repeated until the frame at the last viewpoint is prediction-encoded.

When the frame at the last viewpoint is encoded and m is increased by 1 (operation S1004), operation S1005 is performed, and it is determined that m is not less than M. Then, the number of bits generated by encoding the frames at the initial time when the frame at the second viewpoint is determined as the I frame is stored (operation S1009). Then, i and (M−1) are compared (operation S1010). Since i is less than (M−1), i is increased by 1 to 2 and m is set to 0 (operation S1011).

When the above operations are performed designating frames at third through last viewpoints as I frames, the respective number of bits required to prediction-encode the frames obtained at the initial time when each of the viewpoints is encoded as the I frame and the remaining frames obtained at the same time as the I frame are prediction-encoded as P reference frames with reference to the I frame can be obtained. In other words, when the frame at the last viewpoint is selected as the I frame and the number of bits generated for the prediction encoding is stored (operation S1009), since i is equal to (M−1) in operation S1010, operation S1012 is performed. In operation S1012, the numbers of bits generated when the frames at the first through last viewpoints are processed as I frames are compared. Then, the frame that results in the smallest number of bits for the prediction encoding when designated as the I frame is determined as the I frame for the actual encoding process. As indicated by A, the determined location (LoI) of the I frame is transmitted to the encoding unit 730 which, in turn, encodes the multi-view video based on the determined location of the I frame.

Figure 11:
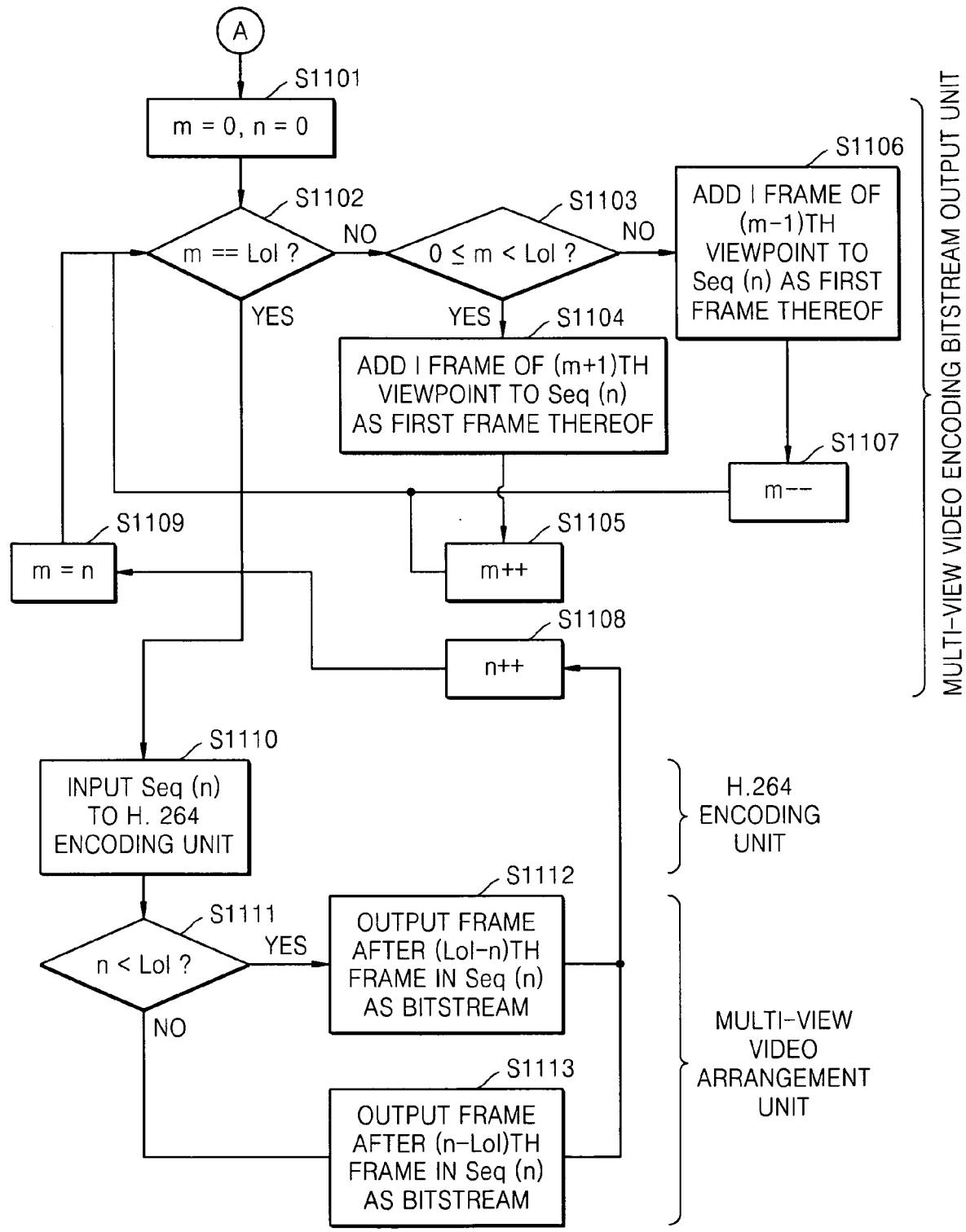
FIG. 11 is a detailed flowchart illustrating an operation of encoding a multi-view video after the location of the I frame is determined in the multi-view video encoding method of FIG. 9, according to an exemplary embodiment of the present invention.

FIG. 11 is a detailed flowchart illustrating the operation of encoding a multi-view video after the location of the I frame is determined in the multi-view video encoding method of FIG. 9. In other words, FIG. 11 illustrates operations performed by the multi-view video arrangement unit 731, the H.264 encoding unit 733, and the multi-view video bitstream output unit 735 included in the encoding unit 730 of the multi-view video encoding apparatus illustrated in FIG. 7.

The description of FIG. 11 will be made based on the assumption that the second viewpoint is determined as the location of the I frame (LoI) as in FIG. 7. In FIG. 11, m denotes the index of a viewpoint of a frame being processed, and n denotes the index of a viewpoint of a frame being encoded. m and n are set to 0 (operation S1101). Since m is not equal to LoI (operation S1102) and m is less than LoI (operation S1103), the I frame at an (m+1)$^{th}$ viewpoint, that is, the first viewpoint (I1 of FIG. 7) is added to a bitstream Seq (0) as a first frame of the first viewpoint such that the bitstream Seq (0) can be input to and encoded by the H. 264 encoding unit 733 (operation S1104). Next, m is increased by 1 to 1 (operation S1105) and compared to LoI (operation S1102). Since m is not equal to LoI, and less than LoI (operation S1103), the I frame at an (m+1)$^{th}$ viewpoint, that is, the second viewpoint (I2 of FIG. 7) is added to the bitstream Seq (0) as a first frame of the first viewpoint such that the bitstream Seq (0) can be input to and encoded by the H. 264 encoding unit 733 (operation S1104).

When m is increased by 1 to 2 (operation S1105), m is equal to LoI (operation S1102). Thus, the H.264 encoding operation is performed (operation S110). In other words, the multi-view video arrangement unit 731 adds the I1 and I2 frames to the bitstream Seq (0) at the first viewpoint i.e., viewpoint 0 and transmits the bitstream Seq (0) having the I1 and I2 frames to the H. 264 encoding unit 731. After the H. 264 encoding unit 733 performs the H. 264 encoding operation, a multi-view bitstream is output by the multi-view bitstream output unit 735. In this operation, n is compared with LoI. Since n is less than LoI (operation S1111), frames after an (LoI−n)$^{th}$ frame, that is, the second frame, in the bitstream Seq (0) are output as a bitstream to remove the frames added for the H. 264 encoding operation (operation S1112). In other words, the added I1 and I2 frames are removed. After operation S1112, n is increased by 1 to 1 (operation S1108) and m is set to 1 (operation S1109). Then, a video bitstream for the second viewpoint (S1 of FIG. 8) is arranged.

Since m is not equal to LoI (operation S1102) and m is less than LoI (operation S1103), the I frame of the second viewpoint (I2 of FIG. 7) is added to a bitstream Seq (1) as a first frame thereof (operation S1104). When m is increased by 1 to 2 (operation S1105), m is equal to LoI (operation S1102). Thus, the H. 264 encoding operation is performed (operation S1110). After the H. 264 encoding operation, the operation of outputting a multi-view bitstream is performed. In this operation, n is compared with LoI. Since n is less than LoI (operation S111), a frame after the $(LoI-n)^{th}$ frame, that is, the first frame, in the bitstream Seq (1) is output as a bitstream (operation S1112). In other words, the added I2 frame is removed. After operation S1112, n is increased by 1 to 2 (operation S1108) and m is set to 2 (operation S1109). Then, a video bitstream for a third viewpoint (S2 of FIG. 8) is arranged.

When m and n are 2, m is equal to LoI. Thus, the H. 264 encoding operation is performed (operation S1110). After the H. 264 encoding operation, the operation of outputting a multi-view video bitstream is skipped since no frames were added for the H. 264 encoding operation. Therefore, operation S1108 is performed. n is increased by 1 to 3 (operation S1108) and m is set to 3 (operation S1109). Then, a video bitstream for a fourth viewpoint, i.e., viewpoint 3 (S3 of FIG. 8) is arranged.

Since m is not equal to LoI (operation S1102) and m is not less than LoI (operation S1103), the I frame of an $(m-1)^{th}$, that is, the second viewpoint (I2 of FIG. 7) is added to a bitstream Seq (3) as a first frame thereof (operation S1106). Then m is reduced by 1 to 2 (operation S1107), and is equal to LoI (operation S1102). Thus, the H.264 encoding operation is performed (operation S1110). After the H.264 encoding operation, the operation of outputting a multi-view bitstream is performed. In this operation, n is compared with LoI. Since n is greater than LoI (operation S1111), a frame after an $(n-LoI)^{th}$ frame, that is, the first frame, in the bitstream Seq (3) is output as a bitstream (operation S1113). In other words, the I2 frame added for the H. 264 encoding operation is removed. After operation S1113, n is increased by 1 to 4 (operation S1108) and m is set to 4 (operation S1109). Then, a video bitstream for a fifth viewpoint (S4 of FIG. 8) is arranged. When a bitstream at the last viewpoint is output in this way, the encoding of the multi-view video is completed.

To decode a multi-view video encoded using the multi-view video encoding method according to an exemplary embodiment of the present invention, first, the I frame is decoded. Then, the P reference frames obtained at the same time as the I frame are decoded using the I frame. Finally, P frames subsequent to the P reference frames at each viewpoint are decoded based on the P reference frames, respectively. The multi-view video thus decoded is provided to a user through a 3D video output apparatus which can output multi-view videos.

According to a multi-view video encoding apparatus and method of the present invention, the location of an I frame, which is a basis for compression-encoding a multi-view video, is not fixed. Instead, the location of the I frame is adaptively determined to enhance prediction efficiency and compression rates.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multi-view video encoding apparatus comprising:
a multi-view video input unit which receives a multi-view video;
an I frame location determination unit which designates a location of an I reference frame among I frames included in multi-view frames, which is a basis for encoding the multi-view video, according to characteristics of multi-view frames at an initial time; and
an encoding unit which encodes the multi-view video based on the designated location of the I reference frame,
wherein the I frame location determination unit and the encoding unit are implemented in a processor, and
wherein the I frame location determination unit designates the location of the I reference frame by designating a first I frame, among the I frames at the initial time as the reference I frame and prediction-encoding remaining I frames at the initial time as P reference frames to determine a first compression efficiency, and designates a second I frame, among the I frames at the initial time as the reference I frame and prediction-encoding remaining I frames at the initial time as P reference frames to determine a second compression efficiency, and compares the first compression efficiency and the second compression efficiency in order to determine a highest compression efficiency.

2. The apparatus of claim 1, wherein the multi-view video input unit transmits the multi-view frames which include I frames at the initial time to the I frame location determination unit, and transmits a multi-view video input which include the multi-view frames and P frames predicted at each view point based on the multi-view frames for each viewpoint of a multi-view image to the encoding unit.

3. The apparatus of claim 1, wherein the I frame location determination unit designates the location of the I reference frame, which has the highest compression efficiency for predicting P reference frames when one I frame of the multi-view frames which include I frames at the initial time is designated as the I reference frame and encoded, and the remaining I frames of the multi-view frames obtained at the same time as the I reference frame are prediction-encoded as the P reference frames with reference to the I reference frame.

4. The apparatus of claim 1, wherein the I frame location determination unit selects one I frame from the multi-view frames which include I frames of each viewpoint at the initial time and encodes the selected I frame as the I reference frame, prediction-encodes remaining I frames of the multi-view frames of each viewpoint obtained at the same time as the I reference frame as P reference frames with reference to the I reference frame, adds numbers of bits used to encode the I reference frame and the P reference frames, stores respectively the added numbers of bits generated at each viewpoint, and designates a location of a frame that, when encoded as the I reference frame, results in the smallest number of bits used as the location of the I reference frame.

5. The apparatus of claim 4, wherein, when selecting one I frame from the multi-view frames which include I frames of each viewpoint at the initial time and encoding the selected I frame as the I reference frame, the I frame location determination unit sequentially selects each I frame of the multi-view frames which include I frames of each viewpoint at the initial time as the I reference frame and prediction-encodes the remaining multi-view frames based on the I reference frame,
wherein, the I frame location determination unit selects a first I frame at a first viewpoint at the initial time as the I reference frame and encodes and prediction-encode frames at remaining viewpoints as the P reference frames with reference to the first I frame, adds numbers of bits used to encode, and stores a total number of bits, then selects an a second I frame at a second viewpoint at the initial time as the I reference frame and encodes and prediction-encode frames at remaining viewpoints as the P reference frames with reference to the second I frame, adds numbers of bits used to encode, and stores a total number of bits.

6. The apparatus of claim 1, wherein the I frame location determination unit prediction-encodes multi-view frames located before the designated location of the I reference frame as P reference frames in a reverse direction from the I reference frame and prediction-encodes multi-view frames located after the designated location of the I reference frame as the P reference frames in a forward direction from the I reference frame.

7. The apparatus of claim 1, wherein the encoding unit comprises a multi-view video arrangement unit which adds at least one multi-view frame for prediction encoding to which another multi-view frame at a viewpoint before or after the designated location of the I reference frame refers and arranges a bitstream for each viewpoint required to encode a video of each viewpoint.

8. The apparatus of claim 7, wherein the encoding unit further comprises an H. 264 encoding unit which performs an H. 264 encoding process using the arranged bitstream, wherein the H. 264 encoding unit encodes sequentially input bitstream of each viewpoint.

9. The apparatus of claim 8, wherein the encoding unit further comprises a multi-view video bitstream output unit which removes the added at least one multi-view frame from the encoded bitstream of each viewpoint.

10. A multi-view video encoding method comprising:
receiving a multi-view video;
designating a location of an I reference frame among I frames included in multi-view frames, which is a basis for encoding the multi-view video, according to characteristics of multi-view frames at an initial time; and
encoding the multi-view video based on the designated location of the I reference frame,
wherein the designating the location of the I reference frame comprises designating a first I frame, among the I frames at the initial time as the reference frame and prediction-encoding remaining I frames at the initial time as P reference frames to determine a first compression efficiency, and designating a second I frame, among the I frames at the initial time as the reference I frame and prediction-encoding remaining I frames at the initial time as P reference frames to determine a second compression efficiency, and comparing the first compression efficiency and the second compression efficiency in order o determine a highest compression efficiency.

11. The method of claim 10, wherein the d designation of the location of the I reference frame comprises designating the location of the I reference frame, which has the highest compression efficiency for predicting P reference frames when one I frame of the multi-view frames which include I frames at the initial time is encoded as the I reference frame, and the remaining I frames of the multi-view frames obtained at the same time as the I reference frame are prediction-encoded as the P reference frames with reference to the I reference frame.

12. The method of claim 11, wherein the prediction-encoding the remaining multi-view frames placed at the same time as the I reference frame as the P reference frames comprises prediction-encoding multi-view frames located before the designated location of the I reference frame as the P reference frames in a reverse direction from the I reference frame and prediction-encoding multi-view frames located after the designated location of the I reference frame as the P reference frames in a forward direction from the I reference frame.

13. The method of claim 10, wherein the designation of the location of the I reference frame comprises:
selecting one I frame from the multi-view frames which include I frames of each viewpoint at the initial time and encoding the selected I frame as the I reference frame, and prediction-encoding remaining I frames of the multi-view frames obtained at the same time as the I reference frame as P reference frames with reference to the I reference frame;
adding numbers of bits used to encode the I reference frame and the P reference frames;
storing the added numbers of bits generated at each viewpoint respectively; and
designating a location of a frame that, when encoded as the I reference frame, results in the smallest number of bits used as the location of the I reference frame.

14. The method of claim 13, wherein the selecting one I frame from the multi-view frames which include I frames of each viewpoint at the initial time and encoding the selected I frame as the I reference frame comprises sequentially selecting each I frame of the multi-view frames which include I frames of each viewpoint at the initial time as the I reference frame and prediction-encoding the remaining multi-view frames based on the I reference frame,
wherein, sequentially selecting comprises selecting a first I frame at a first viewpoint at the initial time as the I reference frame and encoding and prediction-encoding frames at remaining viewpoints as the P reference frames with reference to the first I frame, adding numbers of bits used to encode, and storing a total number of bits, then selecting an a second I frame at a second viewpoint at the initial time as the I reference frame and encoding and prediction-encoding frames at remaining viewpoints as the P reference frames with reference to the second I frame, adding numbers of bits used to encode, and storing a total number of bits.

15. The method of claim 10, wherein the encoding of the multi-view video comprises:
adding at least one multi-view frame for prediction encoding to which another multi-view frame at a viewpoint before or after the designated location of the I reference frame refers; and
arranging a bitstream for each viewpoint required to encode a video of each viewpoint.

16. The method of claim 15, wherein the encoding of the multi-view video further comprises performing H. 264 encoding using the arranged bitstream, wherein sequentially input bitstream of each viewpoint is encoded in the H. 264 encoding process.

17. The method of claim 16, wherein the encoding of the multi-view video further comprises removing the added at least one multi-view frame from the encoded bitstream of each viewpoint.

18. A non-transitory computer-readable recording medium on which a program for executing a multi-view video encoding method comprising:

receiving a multi-view video;

designating a location of an I reference frame among I frames included in multi-view frames, which is a basis for encoding the multi-view video, according to characteristics of multi-view frames at an initial time; and encoding the multi-view video based on the designated location of the I reference frame, wherein the designating the location of the I reference frame comprises designating a first I frame, among the I frames at the initial time as the reference I frame and prediction-encoding remaining I frames at the initial time as P reference frames to determine a first compression efficiency, and designating a second I frame, among the I frames at the initial time as the reference I frame and prediction-encoding remaining I frames at the initial time as P reference frames to determine a second compression efficiency, and comparing the first compression efficiency and the second compression efficiency in order determine a highest compression efficiency.

19. The non-transitory computer-readable recording medium of claim 18, wherein the designation of the location of the I reference frame comprises designating the location of the I reference frame, which has the highest compression efficiency for predicting P reference frames when one I frame of the multi-view frames which include I frames at the initial time is encoded as the I reference frame, and the remaining I frames of the multi-view frames obtained at the same time as the I reference frame are prediction-encoded as the P reference frames with reference to the I reference frame.

20. The non-transitory computer-readable recording medium of claim 19, wherein the prediction-encoding the remaining multi-view frames placed at the same time as the I reference frame as the P reference frames comprises prediction-encoding multi-view frames located before the designated location of the I reference frame as the P reference frames in a reverse direction from the I reference frame and prediction-encoding multi-view frames located after the designated location of the I reference frame as the P reference frames in a forward direction from the I reference frame.

21. The non-transitory computer-readable recording medium of claim 18, wherein the designation of the location of the I frame comprises:

selecting one I frame from the multi-view frames which include I frames of each viewpoint at the initial time and encoding the selected I frame as the I reference frame, and prediction-encoding remaining I frames of the multi-view frames obtained at the same time as the I reference frame as P reference frames with reference to the I reference frame;

adding numbers of bits used to encode the I reference frame and the P reference frames;

storing the added numbers of bits generated at each viewpoint respectively; and designating a location of a frame that, when encoded as the I reference frame, results in the smallest number of bits used as the location of the I reference frame.

22. The non-transitory computer-readable recording medium of claim 21, wherein the selecting one I frame from the multi-view frames which include I frames of each viewpoint at the initial time and encoding the selected I frame as the I reference frame comprises sequentially selecting each I frame of the multi-view frames which include I frames of each viewpoint at the predetermined time as the I reference frame and encoding the remaining multi-view frames based on the I reference frame, wherein, sequentially selecting comprises selecting a first I frame at a first viewpoint at the initial time as the I reference frame and encoding and prediction-encoding frames at remaining viewpoints as the P reference frames with reference to the first I frame, adding numbers of bits used to encode, and storing a total number of bits, then selecting an a second I frame at a second viewpoint at the initial time as the I reference frame and encoding and prediction-encoding frames at remaining viewpoints as the P reference frames with reference to the second I frame, adding numbers of bits used to encode, and storing a total number of bits.

23. The non-transitory computer-readable recording medium of claim 18, wherein the encoding of the multi-view video comprises:

adding at least one multi-view frame for prediction encoding to which another multi-view frame at a viewpoint before or after the designated location of the I reference frame refers; and arranging a bitstream for each viewpoint required to encode a video of each viewpoint.

24. The non-transitory computer-readable recording medium of claim 23, wherein the encoding of the multi-view video further comprises performing H. 264 encoding using the arranged bitstream, wherein sequentially input bitstream of each viewpoint is encoded in the H. 264 encoding process.

25. The non-transitory computer-readable recording medium of claim 24, wherein the encoding of the multi-view video further comprises removing the added at least one multi-view frame from the encoded bitstream of each viewpoint.

* * * * *